United States Patent [19]
Burrows et al.

[11] Patent Number: 5,170,980
[45] Date of Patent: Dec. 15, 1992

[54] CONTAINER HOLDER

[75] Inventors: Bradford J. Burrows; Jay M. Frankhouse, both of Holland, Mich.; John J. Bleau, Worthington, Ohio

[73] Assignee: Prince Corporation, Holland, Mich.

[21] Appl. No.: 692,176

[22] Filed: Apr. 26, 1991

[51] Int. Cl.⁵ .................................................. A47K 1/08
[52] U.S. Cl. .................................... 248/311.2; 108/25; 224/42.45 R
[58] Field of Search .............. 248/311.2, 314, 315; 108/25, 44, 45, 46; 220/737; 224/42.45 R

[56] References Cited

U.S. PATENT DOCUMENTS

| | | |
|---|---|---|
| 1,902,608 | 3/1933 | Baltzley et al. . |
| 3,039,616 | 6/1962 | Proffit . |
| 3,317,171 | 5/1967 | Kramer . |
| 3,326,445 | 6/1967 | Goings . |
| 4,040,659 | 8/1977 | Arnold . |
| 4,303,109 | 12/1981 | Cohen . |
| 4,613,048 | 9/1986 | McGill ............................. 108/44 X |
| 4,645,157 | 2/1987 | Parker . |
| 4,728,018 | 3/1988 | Parker . |
| 4,783,037 | 11/1988 | Flowerday . |
| 4,792,184 | 12/1988 | Lindberg et al. . |
| 4,821,931 | 4/1989 | Johnson . |
| 4,848,627 | 7/1989 | Maeda et al. . |
| 4,892,281 | 1/1990 | DeFilippo et al. . |
| 4,943,111 | 7/1990 | VanderLaan . |
| 4,981,277 | 1/1991 | Elwell . |
| 5,007,610 | 4/1991 | Christiansen et al. ........... 248/311.2 |
| 5,018,633 | 5/1991 | Toth et al. ....................... 248/311.2 |
| 5,024,411 | 6/1991 | Elwell .............................. 248/311.2 |
| 5,072,989 | 12/1991 | Spykerman et al. .......... 296/37.8 X |
| 5,087,008 | 2/1992 | Miller et al. ..................... 248/311.2 |

Primary Examiner—Ramon O. Ramirez
Attorney, Agent, or Firm—Price, Heneveld, Cooper, DeWitt & Litton

[57] ABSTRACT

A subdividable storage bin is provided for a vehicle which includes a divider movably mounted therein, which moves between a use position dividing the bin into separate areas and a stored position leaving the bin substantially undivided. In one embodiment, the divider pivotally rotates into position. In another embodiment, the divider slideably rotates into position. In still other embodiments, the divider resiliently flexes into position. In another embodiment, the divider slips or is dropped into position and is removable for cleaning, washing or storing.

22 Claims, 4 Drawing Sheets

CONTAINER HOLDER

BACKGROUND OF THE INVENTION

The present invention pertains to container holders for vehicles such as an automobile and in particular to container holders providing flexibility of use.

Modern vehicles are necessarily supplied with a variety of storage and holding bins intended to satisfy a variety of needs. For example, some bins and pockets are useful for storing elongated items such as sunglasses, pocketbooks, maps, pencils and the like, while smaller bins and pockets are desired for such items as coins, gum, keys, and the like. Still other container holding structure is useful for holding containers such as cans or cups in a position which allows easy access. However, due to the compact size of the passenger compartment of modern vehicles and also due to the constantly changing uses thereof, it is difficult to design and position a single storage bin which satisfies all needs. Therefore, there is a need to provide a storage bin which is adaptable to receive both large and small objects, and which also can be used as a container holder. Further, there is a need to provide a storage bin which solves these problems at a relatively low cost and without unnecessary complexity.

SUMMARY OF THE INVENTION

According to one aspect of the present invention, a subdividable storage bin is provided which overcomes these difficulties by providing a low cost subdividable storage bin offering flexibility of use. A subdividable storage bin embodying the present invention includes a storage bin having a divider movably positioned between two positions. In a first position, the storage bin is divided into substantially separate areas and in a second position the divider is positioned to leave the storage bin substantially undivided.

In a preferred embodiment, the divider is made of a resiliently flexible material which resiliently flexes between a first position wherein the divider forms a ring shaped cupholder with the end of a storage bin, and a second position wherein the divider flexes outwardly against an end of a storage bin to leave the storage bin substantially undivided.

In another embodiment, a container holder is also made of a resiliently flexible wall which flexes between a first use position to form a ring-shaped container holder in cooperation with a housing recess, and a stored position wherein the wall flexes inwardly into the recess.

In yet another embodiment, a removable cylindrically shaped shell with inwardly extending flexible arms mateably fits within a recess formed in a vehicle console or other location, the shell being removable for storage and cleaning. In a modification, the shell mateably fits into a bin which is oblong in shape, with the shell being laterally adjustable therein.

These and other features, objects and advantages of the present invention will become apparent reading the following description thereof together with reference to the accompanying drawings in which:

DETAILED DESCRIPTION OF THE PREFERRED EMBODIMENTS

Figure 1:
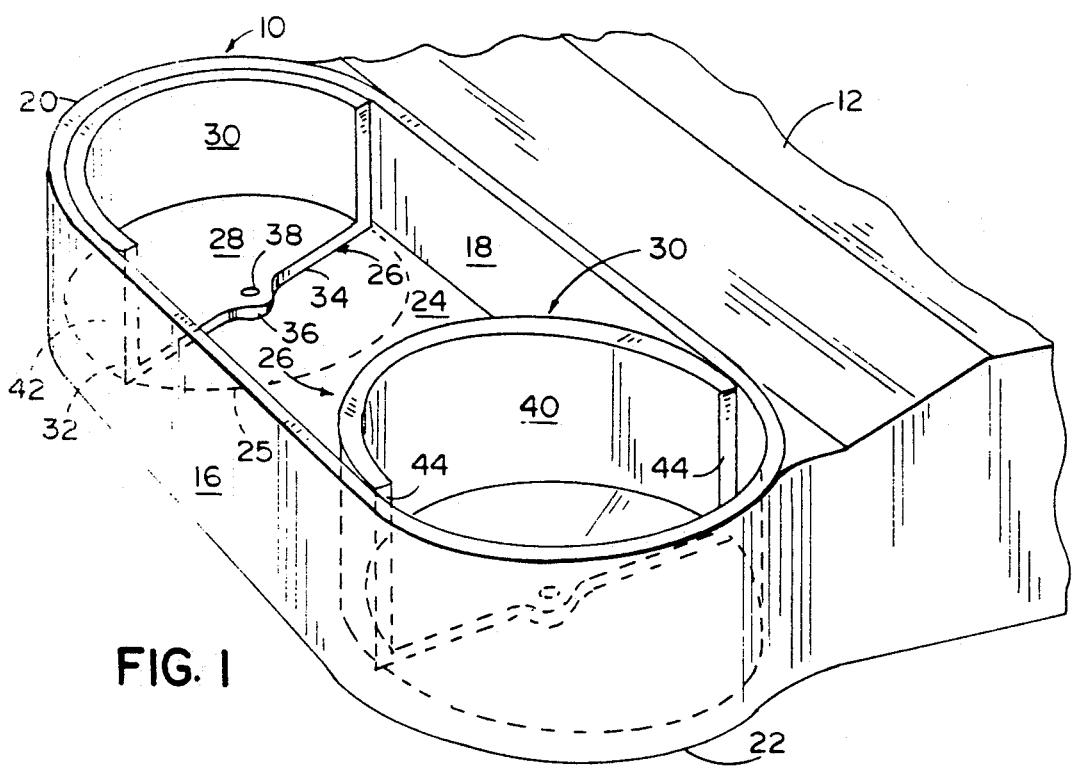
FIG. 1 is a fragmentary perspective view of a vehicle center armrest including a storage bin embodying the present invention.
Figures 2, 4:
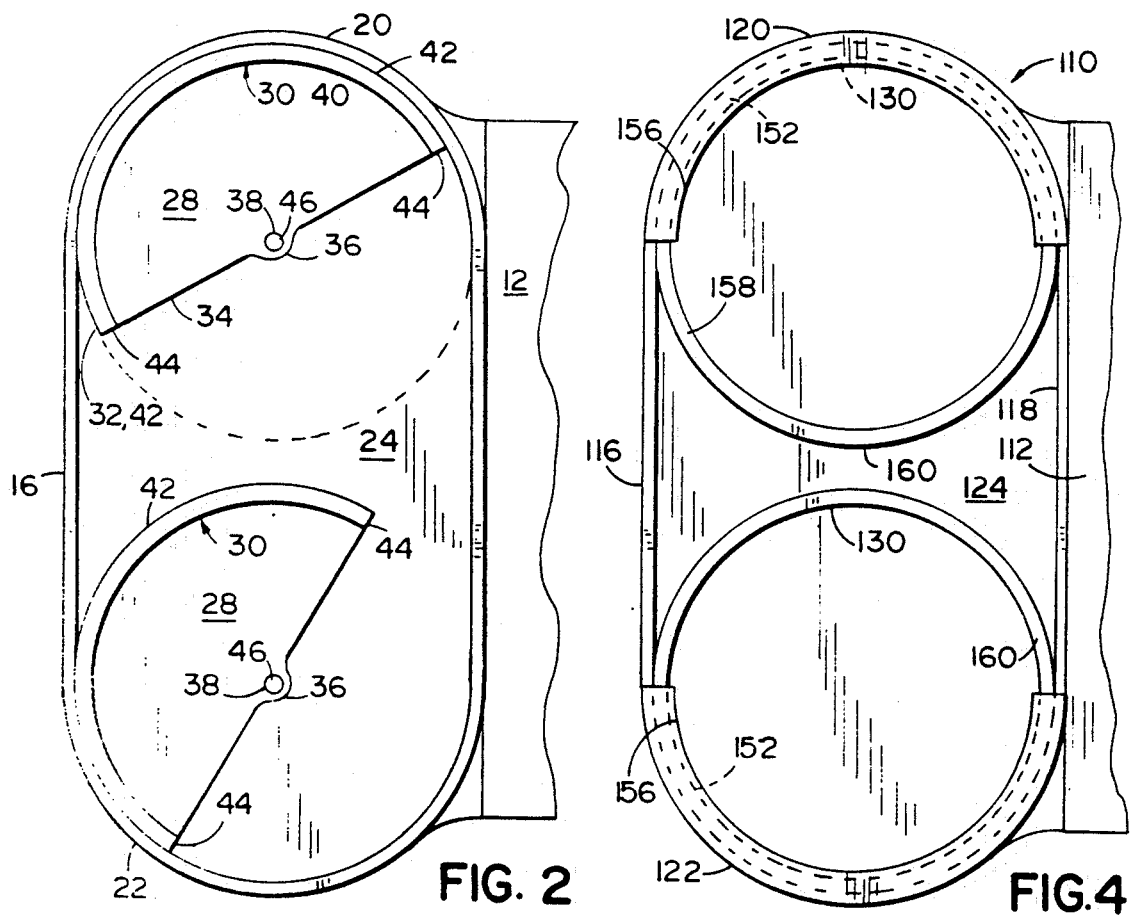
FIG. 2 is a top plan view of the structure shown in FIG. 1 with the dividers partially rotated in the bin.
FIG. 4 is a top plan view of the structure shown in FIG. 3 with the divider partially rotated in the bin.

Referring initially to FIGS. 1 and 2, there is shown a first subdividable storage bin 10 embodying the present invention. Storage bin 10 is particularly adapted for use as either a substantially undivided storage bin or as a divided storage bin which defines a pair of container holders. In the preferred embodiment, storage bin 10 is positioned at the forward end of a center console or armrest 12 between front vehicle seats (not shown). Storage bin 10 is generally oblong and is defined by a planar front side 16 and a planar rear side 18 integrally joined by arcuately shaped ends 20 and 22. Storage bin 10 includes a bottom 24 which integrally attaches to sides 16, 18 and ends 20, 22 to form an upwardly opening storage container. One or more curved moveable dividers 26 are positioned within storage bin 10 and moveable between a use position wherein divider 26 divides storage bin 10 into at least two compartments, and a stored position wherein divider 26 is positioned to leave storage bin 10 substantially undivided.

Each of the two dividers 26 located at opposite ends of the bin 10 of the embodiment shown include a semi-disk shaped bottom 28 and an integral upstanding curved side wall 30. Bottom 28 (FIG. 2) is substantially semicircular and planar in shape and includes a perimeter defined by an arcuately shaped outer edge 32 connected to a straight inner edge 34. Midway along edge 34 is an enlarged flange 36 in which an aperture 38 for receiving pivot pin 46 is formed. Side wall 30 extends upwardly from arcuate outer edge 32 and is defined by interior surface 40, exterior surface 42, and vertical edges 44. The pivot pin 46 extends upwardly from bottom 24 through the aperture 38 of bottom 28 to pivotally mount each of the dividers 26 to the storage bin 10 such that divider 26 can be rotated within storage bin 10 between a use position wherein divider 26 divides storage bin 10 into separate areas, and a removed position wherein divider 26 is positioned to leave storage bin 10 substantially undivided. In the stored position (FIG. 1, left side), exterior surface 42 of side wall 30 is positioned substantially adjacent to end 20 of storage bin 10. Alternatively, divider 26 can be rotated to a use position wherein side wall portion 30 extends between sides 16, 18 of storage bin 10, dividing storage in 10 into two (or more) areas. In this use position, terminal edges 44 are adjacent front side 16 and rear side 18 of storage bin 10 facing the enclosed end as seen in the right side of FIG. 1, and the interior surface 40 forms a ring-like structure with end 22 thereby adapting bin 10 to receive a container such as a can or cup. Alternatively, this divided storage area can be used to store smaller objects such as coins, candy, small toys and the like. It should be noted that divider 26 can also be rotated only halfway thereby adapting bin 10 to receive a cup with a handle.

It is contemplated that bottom 28 of divider 26 could also be enlarged to a circular shape and be mounted within a shallow circular depression 25 (shown in phantom form in FIGS. 1 and 2) in the bottom of storage bin 10. In such construction, the upper surface of bottom 28 would be flush with bottom 24 of bin 10. Alternatively, a shallow semi-circular depression could be formed in the bottom of storage bin 10 so that bottom 28 drops downwardly into a flush position with bottom 24 as divider 26 is moved to a use position. The edges of such a depression would be inclined to assist in camming the divider out of the use position and the pivot mounting of the divider would accommodate sufficient vertical movement of the divider to allow it to move into and out of such a recessed area in the floor Of the bin. Such construction provides a flat support floor for a container held therein. In the preferred embodiments, the storage bin 10 includes two dividers 26 which are spaced to provide clearance between them when in a use position for providing dual container holders.

Figure 3:
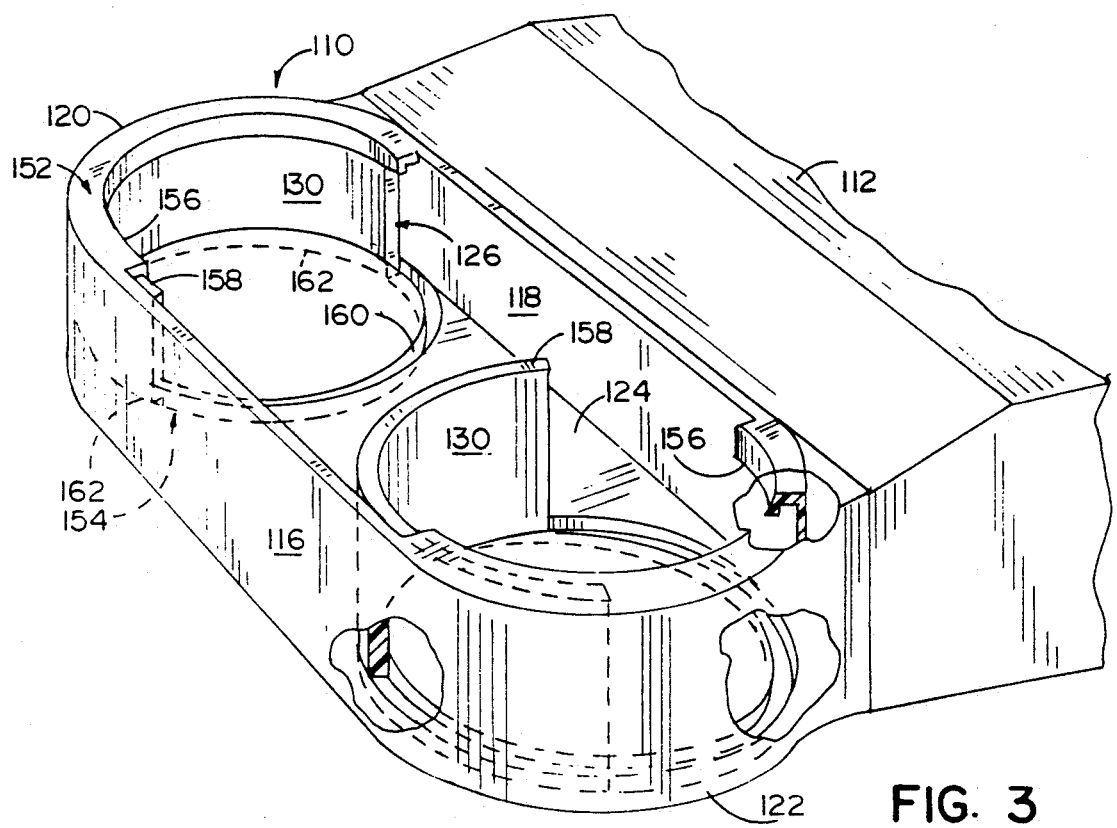
FIG. 3 is a fragmentary perspective view of a second embodiment of the invention.

In a second embodiment, shown in FIGS. 3 and 4, structure similar to that of the first embodiment are identified with the same referent numbers preceded by the reference numeral 1. A storage bin 110 is provided in a center console 112, and is similar to storage bin 10 as far as having sides 116, 118, ends 120, 122, and bottom 124 which define an upwardly facing opening. However, in this embodiment, the upwardly facing opening defines a perimeter which includes upper and lower grooves 152, 154 which are located at either end 120, 122. The embodiment shown includes an upper groove 152 which is generally rectangular and formed upwardly in an inwardly extending semi-circular lip 156 integral with ends 120 and 122 and located at the upper edge of ends 120, 122. A lower semi-circular groove 154 is formed in bottom 124 adjacent either end 120, 122. Lip 156 thus captures the upper edge 158 of side wall portion 130 of divider 126. In this embodiment, upper edge 158 extends far enough around the radius of a circle such that side wall 130 cannot be rotated to a position allowing divider 126 to fall out of groove 152. It is contemplated that either groove 152 or side wall 130 can be extended past 180° to accomplish this purpose.

Additionally, lower groove 154 is shown formed in bottom 124 of storage bin 110 defines a generally rectangular channel 160 which extends 360° forming a circle in the end of storage bin 110 and adjacent ends 120, 122. Channel 160 receives the lower edge 162 of side wall portion 130 and guides side wall 130 as it is rotationally moved in storage bin 110. It is contemplated that lower edge 162 of side wall 130 can be designed with a multitude of different shapes to positively retain side wall 130 within bottom 124. Though an upper and lower track are disclosed, it is specifically contemplated that modifications could be made such that only one groove 152 or 154 is required.

Figure 5:
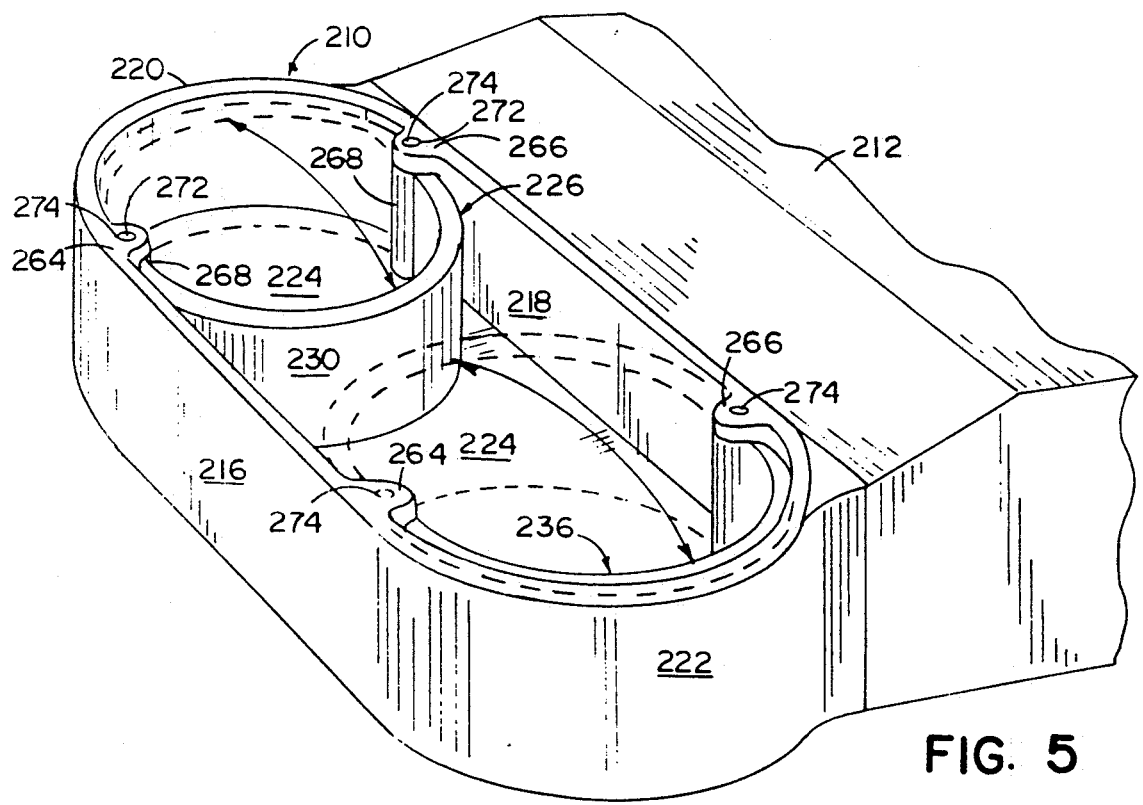
FIG. 5 is a fragmentary perspective view of another embodiment.

A third embodiment (FIG. 5) shows yet another storage bin 210 which is also similar to storage bin 10 with the exception that storage bin 210 includes attachment tabs 264 and 266 positioned along sides 216, 218 respectively, tabs 264, 266 providing a means for attachment of a flexible divider 226. In this embodiment, divider 226 is comprised of a side wall 230 which is made of a resilient flexible material such as rubber and which has a length generally equal to one half of the circumference of the circular container holder defined by the walls 230 when in a dividing position. Divider 226 further includes outer ends 268 having vertically extending holes for receiving elongated pins 274 mateably fit through holes 272 in tabs 264, 266 and through the vertical holes in outer ends 268, and downwardly into bottom 224 of storage bin 210. This construction captively but pivotally constrains the opposite ends of walls 226. Since dividers 226 are made of a resiliently flexible material, they can be flexibly moved between a use position wherein divider 226 forms a ring-like structure with ends 220 (or 222) and a stored position wherein divider 226 is positioned substantially adjacent end 220 (or 222). Side wall 230 elastically bends into an intermediate position in the shape of an "S" as divider 226 is moved between use and removed positions, and outer ends 268 pivotally, hingedly rotate on elongated pins 274.

Figure 6:
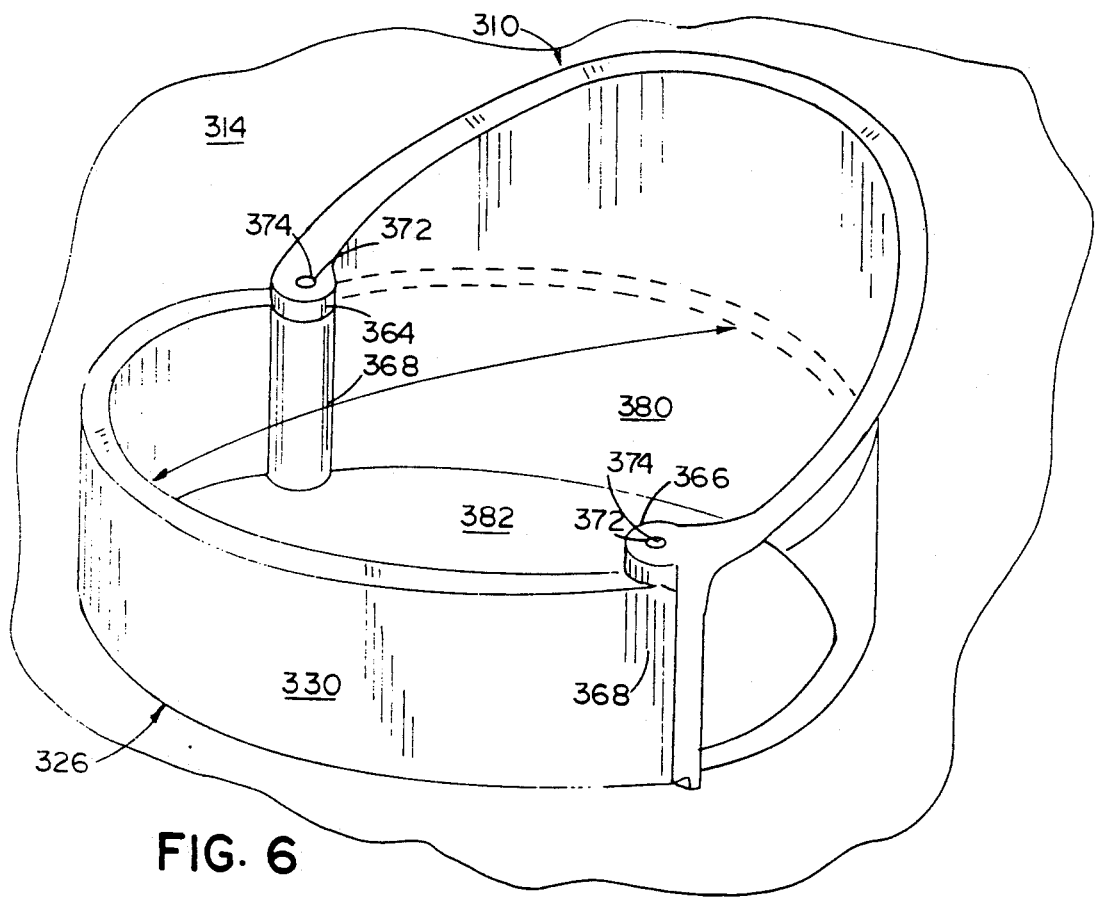
FIG. 6 is a fragmentary perspective view of another embodiment.

In a fourth embodiment (FIG. 6), an open C-shaped recess or bin 310 is formed along the front of a vehicle console or vehicle side wall 314. In this embodiment, recess 310 includes an open semicircular wall 380 and a bottom 382. Storage bin 310 includes attachment tabs 364, 366 located at either outside edge of recess 380 and protruding inwardly therefrom. A flexible divider 326 includes a side wall 330 which is made of a resilient flexible material such as rubber and which has a length to define a circle in conjunction with wall 380 as seen in FIG. 6. Divider 326 further includes outer ends 368 with vertically extending holes for receiving elongated pins 374 which mateably fit through holes 372 in tabs 364, 366 and the vertical holes in outer ends 366, 368, and into bottom 382 of recess 310. Since side wall 328 is made of resiliently flexible material, it can be moved between a use position wherein divider 326 forms a ring-like container holder with recess wall 380, and resiliently flexed to a stored position wherein divider 326 is positioned substantially adjacent inner wall 380 of recess 310. Side wall 330 elastically bends into an intermediate position in the shape of an "S" configuration and outer ends 366 and 368 pivotally rotate on elongated pins 374 as divider 326 is moved between use and removed positions. Thus, wall 330 moves between two over-center stable positions in a snap-action motion.

In a fifth embodiment (FIGS. 7-9), a storage bin 410 is provided with one or more removable dividers 426. Each removable divider 426 can be positioned in various locations within recess or storage bin 410. Divider 426 is comprised of a generally cylindrical cup-shaped shell which includes a generally cylindrical but slightly outwardly tapered (from bottom to top) side wall 486 which forms an upwardly facing opening. Side wall 486 is adapted to mateably and securely fit within recess 410 and in the preferred embodiment, is made of rubber or a rubber-like resilient material such that it statically frictionally engages sides 416, 418 of bin 410 as it is forced downwardly therein. However, it is contemplated that a number of different methods could be used to retain shell 484 within sides 416, 418 such as side ridges 488 which fit into depressions (not, shown) in sides 416, 418. It is further contemplated that divider 426 may expand after insertion into storage bin 410, thus creating sufficient force upon expansion to retain cylindrical divider 426 within recess 410. By this manner, divider 426 can be removed from storage bin 410 and cleaned or washed.

Figure 8:
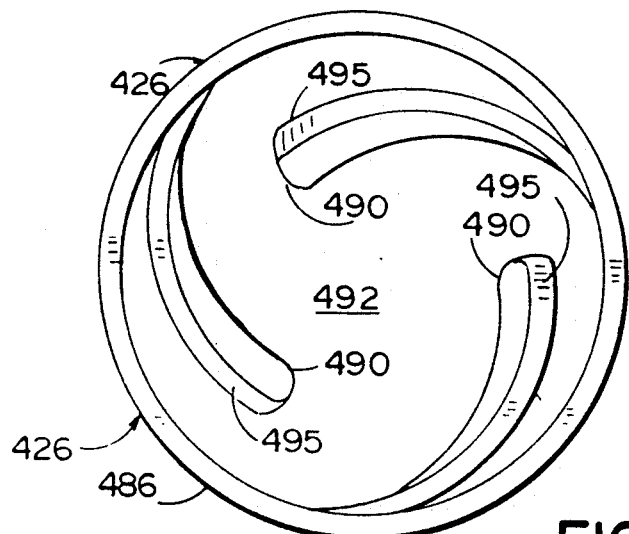
FIG. 8 is a top plan view of a portion of the structure shown in FIG. 7.

In the preferred embodiment, the cup-shaped shell forming divider 426 includes inwardly projecting tangential flexible fingers 490 which are integrally molded on the inside of wall 486. Three such fingers are employed in the embodiment shown and they extend spirally or helically inwardly from the interior surface 440 of side wall 430. Flexible fingers 490 are resiliently flexible and therefore are adapted to retain various sized containers therein. As is best shown in FIG. 8, flexible fingers 490 twist somewhat as they radiate inwardly, thus opening fingers 490 vertically so that a container can be placed therein more easily. Thus, the top edge 495 of each finger 490 is spaced slightly further from the center of the shell 426 than the bottom edge 497 as best seen in FIG. 8.

Divider 426 integrally includes a bottom 492 in the preferred embodiment to provides a liquid tight container with side wall 430. This permits removable divider 426 to capture spilled liquid around a cup and permit divider 426 to be removed, dumped, and washed for further use. It is contemplated that divider 426 could also be provided without bottom 492 and still function as a divider for storage bin 410.

Figure 7:
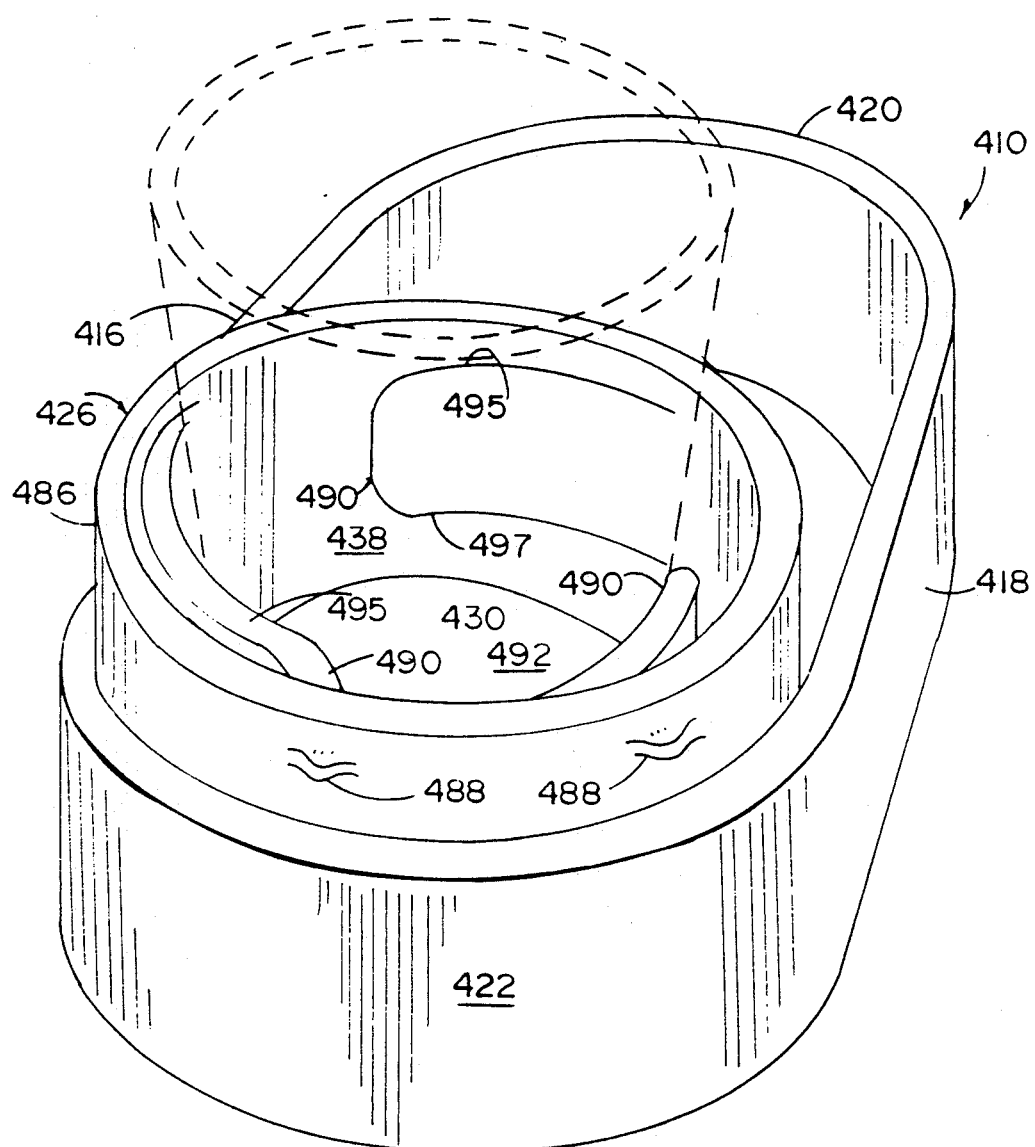
FIG. 7 is a fragmentary perspective view of yet another embodiment.
Figure 10:
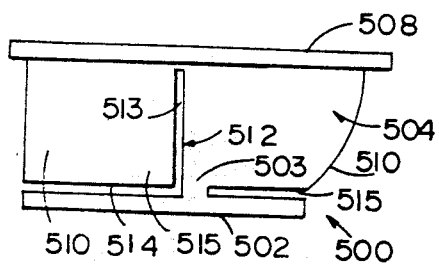
FIG. 10 is a front elevational of another embodiment of the structure shown in FIGS. 8 and 9.
Figure 9:
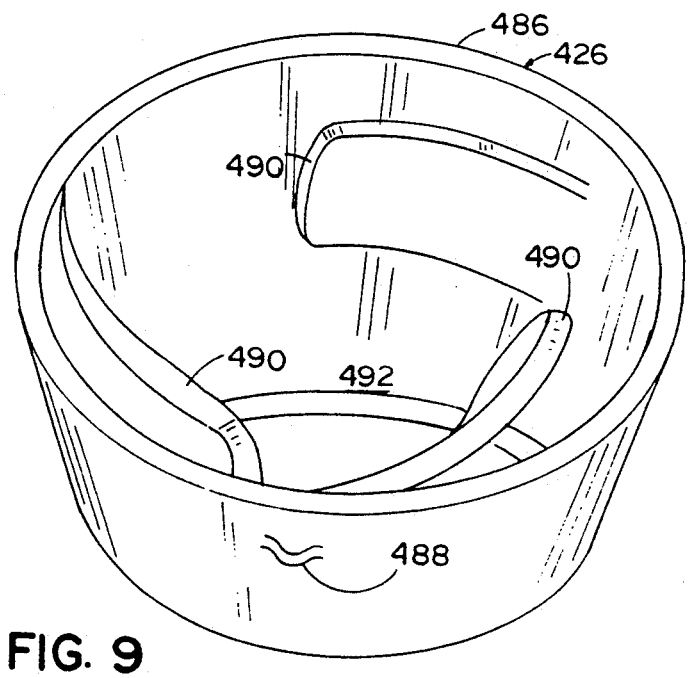
FIG. 9 is a perspective view of the structure shown in FIG. 7.

An alternative embodiment of the resilient shell construction of FIGS. 7-9 is shown in FIG. 10 where a cup-shaped container holding insert 500 is shown. In this embodiment, the shell 500 includes a disk-shaped floor 502 with a slotted sidewall 504 joined to floor 502 by equally spaced lands 503 positioned around the periphery of the floor. A peripheral rim 508 extends around the top of the shell 500 such that the shell can be dropped into a circular opening in a console and supported by rim 508. Instead of the solid sidewall with separate inwardly projecting fingers of the previous embodiment, in this embodiment, the side 504 is divided into a plurality of resilient flaps 510 by L-shaped notches 512 each having a vertical leg 513 and a horizontal leg 514. The free corner 515 of each flap 510 is formed to extend inwardly as seen in the right end of FIG. 10, to engage and hold containers of different diameters much in the same manner as twisted legs 490 of the previous embodiment. Member 500 is also integrally molded of a suitable resilient material such as a rubber compound.

It should be evident from the above descriptions that the various forms of the invention provides subdividable storage bins for a vehicle. This is made possible by the unique moveable dividers which move rotationally and slideably move into position, and also dividers which flex between stored and use positions. It will be apparent to those skilled in the art that various other modifications to the preferred embodiment can be made without departing from the spirit or scope of the invention as defined in the appended claims.

The embodiments of the invention in which an exclusive property or privilege is claimed are defined as follows:

1. A subdividable storage bin for a vehicle comprising:
    a storage bin in a vehicle useful for storing personal effects, said storage bin having a bottom, sides and ends forming an upwardly facing elongated opening;
    a divider movably mounted within said storage bin and moveable between a use position wherein said divider divides said storage bin into smaller areas, and a removed position wherein said divider is positioned to leave said storage bin substantially undivided and unobstructively open for access; and
    means for attaching said divider to said storage bin to allow movement between said use and removed positions in said storage bin.

2. The apparatus as defined in claim 1 wherein said divider includes a side wall which is mateably positionable adjacent one of said ends of said storage bin when said divider is in said removed position.

3. A subdividable storage bin for a vehicle comprising:
    a storage bin in a vehicle useful for storing personal effects, said storage bin having a bottom, sides and ends forming an upwardly facing elongated opening;
    a divider movably mounted within said storage bin and moveable between a use position wherein said divider divides said storage bin into smaller areas, and a removed position wherein said divider is positioned to leave said storage bin substantially undivided, said divider including a sidewall which is mateably positionable adjacent one of said ends of said storage bin when said divider is in said removed position, said divider including a bottom portion; and
    means for attaching said divider to said storage bin to allow movement between said use and removed positions in said storage bin, said means for attaching including an axle means operably connecting said bottom portion of said divider to said bottom of said storage bin, said axle means permitting rotational movement of said divider relative to said storage bin.

4. The apparatus as defined in claim 3 wherein a shallow depression is located in said bottom of said storage bin, said depression being designed to mateably receive said bottom portion of said divider such that said divider forms a substantially flat surface with said bottom of said storage bin thereby providing said flat surface to stably support a container thereon.

5. A subdividable storage bin for a vehicle comprising:
    a storage bin in a vehicle useful for storing personal effects, said storage bin having a bottom, sides and ends forming an upwardly facing elongated opening;
    a divider movably mounted within said storage bin and moveable between a use position wherein said divider divides said storage bin into smaller areas, and a removed position wherein said divider is positioned to leave said storage bin substantially undivided; and
    means for attaching said divider to said storage bin to allow movement between said use and removed positions in said storage bin, said means for attaching including a track means located in said storage bin, said divider being slideably positionable on said track means between said use and removed position.

6. The apparatus as defined in claim 5 wherein said track means is located in said bottom of said divider and cooperates with a bottom edge of said divider to allow slideable movement of said divider on said bottom.

7. The apparatus as defined in claim 5 wherein said divider includes a side wall, and said track means is located in said side of said storage bin near an upper edge and also a lower edge of said upwardly facing opening, said track means cooperating with said side wall of said divider and said bottom of said storage bin to allow slideable movement of said divider within said storage bin.

8. A subdividable storage bin for a vehicle comprising:
a storage bin in a vehicle useful for storing personal effects, said storage bin having a bottom, sides and ends forming an upwardly facing elongated opening;
a divider movably mounted within said storage bin and moveable between a use position wherein said divider divides said storage bin into smaller areas, and a removed position wherein said divider is positioned to leave said storage bin substantially undivided, said divider including a side wall which is made of a resiliently flexible material having a length and outer ends, said length being somewhat greater than the distance between said sides of said storage bin; and
means for attaching said divider to said storage bin to allow movement between said use and removed positions in said storage bin, said means for attaching being pivotally attached to said outer ends of said divider such that said side wall is resiliently flexibly moveable between said use and removed position.

9. The apparatus as defined in claim 8 wherein said divider is made of a rubber-like material.

10. The apparatus as defined in claim 8 wherein said divider is positioned mateably adjacent one of said ends of said storage bin when said divider is in said removed position thereby leaving the storage bin substantially undivided, and further is positionable so as to form a ring-like structure suitable for supporting a container such as a cup when said divider is moved to said use position.

11. A container holder system for a vehicle comprising:
a vehicle support member including a C-shaped recess formed therein;
attachment means located on either side of said recess;
a resilient flexible member having outer ends attached to said attachment means, said length of said flexible member being greater than the distance between said spaced attachment means of said recess causing said flexible member to resiliently flex between a use position wherein said flexible member is bowed outwardly to form a ring-shaped container holder with said recess and a stored position wherein said flexible member is bowed inwardly into said recess.

12. The apparatus as defined in claim 11 wherein said flexible member is made of a rubber-like material.

13. The apparatus as defined in claim 11 wherein said outer ends of said flexible member are pivotally attached to said attachment means, and said attachment means includes axle means which pivotally attach said outer ends to said recess.

14. The apparatus defined in claim 11 wherein said recess includes a bottom capable of providing support to a container placed in said recess when said flexible member is in said use position.

15. A container holder system for a vehicle comprising:
a support member for mounting in a vehicle, said support member including a recess for receiving a container holder; and
a container holder comprising a generally cylindrically shaped shell having a sidewall forming an upwardly facing opening, said shell shaped to mateably and securely removably fit within said recess of said support member, said shell including at least one helically shaped flexible finger spirally extending inwardly from said sidewall of said shell, said finger resiliently deformable to retain variously sized container in said shell.

16. The container holder as defined in claim 15 wherein said shell and said at least one flexible finger are formed of a single material.

17. The container holder as defined in claim 16 wherein said material is rubber-like.

18. The container holder as defined in claim 15 wherein said shell includes a bottom forming a liquid tight container.

19. The container holder as defined in claim 15 wherein said recess is oblong in shape and includes a bottom, and said shell is made of a material having rubber-like frictional characteristics which hold said shell in a given position in said recess, said shell being laterally adjustable in said recess.

20. The container holder as defined in claim 15 wherein said recess and said side wall of said shell include mating ridges and depressions respectively which removably retain said shell in said recess.

21. The container holder as defined in claim 15 wherein said at least one flexible finger twists as said at least one flexible finger extends inwardly to position said at least one flexible finger in an open orientation so as to accept a container.

22. The container holder as defined in claim 15 wherein said flexible finger are sections of said sidewall of said shell defined by slots formed in said sidewall.

* * * * *